Jan. 28, 1969

C. E. MONNICH 3,424,429

SOLENOID OPERATED VALVE

Filed Oct. 23, 1965

INVENTOR.
CARL E. MONNICH,

By Knight & Rodgers
ATTORNEYS.

United States Patent Office 3,424,429
Patented Jan. 28, 1969

---

3,424,429
SOLENOID OPERATED VALVE
Carl Eugene Monnich, Granada Hills, Calif., assignor to Sterer Engineering and Manufacturing Company, Los Angeles, Calif., a corporation of California
Filed Oct. 23, 1965, Ser. No. 502,988
U.S. Cl. 251—129    5 Claims
Int. Cl. F16k *31/02, 1/42*

ABSTRACT OF THE DISCLOSURE

A solenoid operated valve has an all-metal construction making it especially suitable for handling corrosive liquids or gases. A laterally rigid diaphragm guides the poppet and eliminates the need for sliding contacts for guiding the poppet toward the valve seat. Heretofore, such contacts have been subject to becoming stuck or corroded and thus causing malfunction. The poppet is preferably of hemispheric shape to seal against the valve seat with maximum use and certainty.

---

The present invention relates generally to valves for controlling fluid flow; and is more especially concerned with a valve of novel design for controlling the flow of corrosive fluids.

Many of the fluids handled today in modern industry, especially in chemical processing plants and power generating plants, are very active chemically and react to a greater or lesser extent with the materials with which they come in contact. Such fluids may be generally referred to as corrosive fluids because of their chemical activity. This characteristic of the fluid controlled by a valve presents many obvious problems to the designer, since many known types of valve designs rapidly become unreliable, if not completely inoperative, as a result of the reaction between the fluid and the parts of the valve.

The problems encountered generally center around relatively moving surfaces which are in sliding contact. Corrosion of one or both of these surfaces roughens the surfaces, often causing them to move with difficulty and affecting adversely the speed and reliability of operation of the valve; and such corrosion, carried to a sufficient extent, may render the valve completely useless since the contacting surfaces become stuck together.

Other requirements of satisfactory design include adequate sealing against leaks, simplicity of design, and satisfactory operation over a long period of time.

Thus, it becomes a general object of the present invention to provide a novel design for a poppet valve that eliminates sliding contact between surfaces on parts that are exposed to the corrosive fluid being regulated or controlled and where sticking between mutually contacting surfaces can result.

It is also an object of the present invention to provide a novel design for a poppet valve adapted to handle corrosive fluids that achieves a long and satisfactory operating life by eliminating close fits between relatively moving parts, and the friction attendent thereon, and by also reducing to a minimum the number of moving parts in the valve.

The above objects of the present invention are achieved in a valve embodying the present invention by providing a housing having spaced fluid inlet and outlet openings and an annular seat in the fluid passage extending between these openings. Cooperating with the annular seat to control fluid flow, is a poppet which is movable toward and away from the seat. The poppet is mounted on a diaphragm which is typically metal, such diaphragm being flexible in a direction transverse to the plane of the diaphragm in order to permit the desired range of movement of the poppet toward and away from the valve seat but being relatively rigid in the plane of the diaphragm in order to guide the poppet in said movement without the necessity of other guiding elements. In a preferred embodiment, the poppet is biased toward the annular seat to a closed position and is opened in opposition to the biasing means by any suitable instrumentality, for example, a solenoid. When a solenoid is used for this purpose, it is preferable to add magnetic shielding means to guide the flux into an armature mounted on the diaphragm in order to achieve maximum efficiency of operation of the poppet.

How the above objects and advantages of the present invention, as well as others not specifically mentioned herein, are achieved will be more readily understood by reference to the following description and to the annexed drawing, in which.

Figure 1:
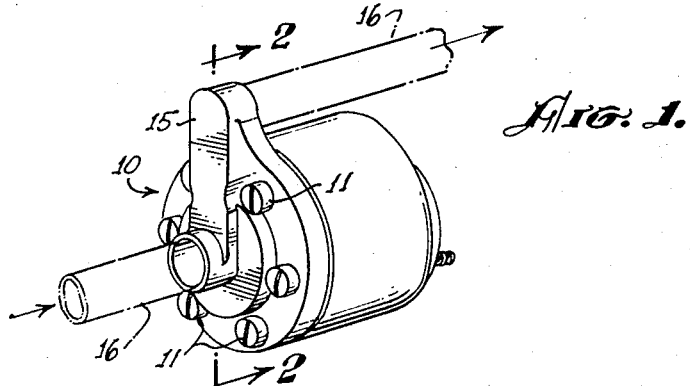
FIG. 1 is a perspective view of the exterior of a poppet valve embodying the present invention.

Referring now to the drawing, it will be seen that the valve illustrated therein comprises a housing indicated generally at 10, the housing being made in two parts which are secured together by any suitable means, as for example by machine screws 11. Housing 10 is provided with an inlet opening 12 and an outlet opening 14 which are interconnected by fluid passage 15 within the housing. The openings 12 and 14 are here shown as being adapted to receive smooth wall tubing 16 as a means for conducting fluid to and from the valve. Tubing of this character is designed to be attached to the housing by brazing or welding; but it will be realized that a threaded joint may be provided if desired.

Figure 2:
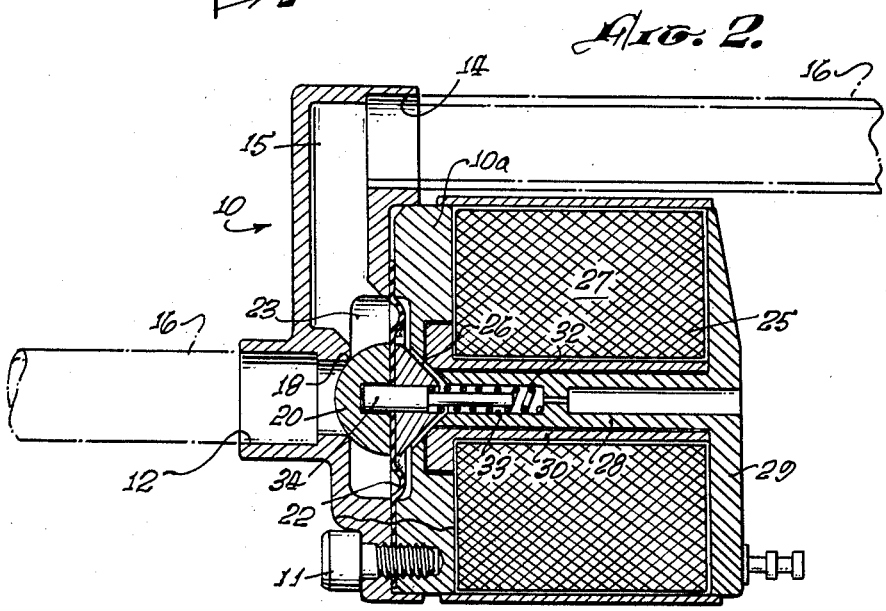
FIG. 2 is an enlarged median longitudinal section through the valve and the fluid passage within the housing, showing the valve in closed position.

Inside housing 10 there is provided annual valve seat 18 which is preferably shaped to provide a sharp edge as a seat which is engaged by poppet 20. Valve seat 18 is located in fluid passage 15 so that the passage is closed to fluid flow when poppet 20 is against the seat as shown in FIG. 2.

While poppet 20 may be of any suitable material, it is preferred to make it of tungsten carbide as this material combines hardness with chemical inertness with respect to the fluid being controlled. The poppet is mounted upon diaphragm 22 which is confined entirely around its perimeter by being clamped between the two portions of housing 10, thus leaving the central portion of the diaphragm free. The poppet is mounted on the diaphragm concentrically of valve seat 18; and the chamber 23 within housing 10 is also circular in cross section and concentric with seat 18.

Although poppet 20 may have any desired shape, it is highly satisfactory to make it hemispherical as shown. This shape permits it to seat tightly in a wide range of positions and simplifies the problem of obtaining exact orientation of the poppet with respect to seat 18.

Figure 3:
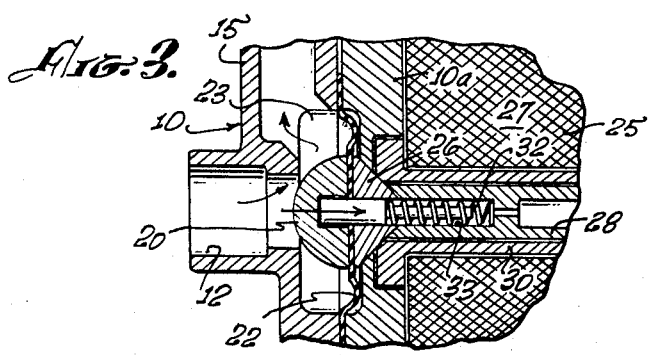
FIG. 3 is a fragmentary section similar to FIG. 2 but showing the valve in open position.

Diaphragm 22 is preferably metal, being an alloy that is chemically inert with respect to the fluid passing through passage 15. While various other metal alloys may be used, a particularly satisfactory one is a high chromium ferrous alloy, such as one of the stainless steels. Housing 10 is preferably of a similar material. A diaphragm of this type has sufficient flexibility in a direction axially of seat 18 that poppet 20 can move into engagement with the seat and away from it to an open position as shown in FIG. 3. At the same time, the diaphragm is relatively rigid in the plane of the diaphragm, normal to the axis of seat 18, so that poppet 20 has little or no lateral movement as it moves away from the seat. As a result the poppet always engages at the same position on the seat, thus eliminating wear on the poppet and on the seat. This rigidity of the diaphragm guides the poppet as it moves axially toward and away from seat 18 without the need for any sliding contact between guiding surfaces.

Another advantage of this construction is that the metal diaphragm is impervious to the fluid contained in passage 15, the diaphragm actually serving as a portion of the wall bounding the fluid passage through the valve; and seal between the diaphragm and the housing around the perimeter of the diaphragm can be proof against fluid leakage.

Poppet 20 is preferably moved to the open position in FIG. 3 by energizing solenoid 25, which may be of any suitable design, but here includes a winding 27 around an iron core 28 shown as integral with cover plate 29. For efficient and quick response of the diaphragm to energization of the solenoid, there is mounted on the back side of the diaphragm, opposite poppet 20, an armature 26 of soft iron or other magnetic material.

It will be noticed that the rear face of armature 26 is given a frusto-conical shape; and housing section 10a and core 28 of the solenoid are recessed to a similar shape. Core 28 is surrounded by a non-magnetic shield 30 which extends radially outwardly from the core at the end of the solenoid winding adjacent the armature and provides a non-magnetic spacer between the magnetic metal of core 28 and housing section 10a in the wall of the tapered recess opposing armature 26. The result is to direct the flux created by the solenoid through armature 26 as it passes between housing section 10a at the end of the winding and core 28. The result is to effect a concentration of flux in the armature and to obtain more rapid and positive opening action of the valve for the application of a given current to solenoid 25.

Poppet 20 is normally biased toward the closed position by some suitable means, such as spring 32 contained in a bore 33 in solenoid core 28. The spring bears at one end against a shoulder in the bore and at the other end against a shoulder on pin 34 which serves as a means for mounting both poppet 20 and armature 26 on diaphragm 22. Pin 34 may be provided with an extension of reduced diameter which fits within the coils of spring 32.

The bore in the solenoid core preferably vents to the atmosphere, as shown, and may be provided with a reduced diameter section to reduce the possibility that foreign matter may enter the bore.

From the foregoing description it will be seen that the invention eliminates all sliding contact between parts exposed to fluid flowing through passage 15. Diaphragm 22 isolates all other moving parts, except poppet 20, from the corrosive fluid; and both the diaphragm and the poppet are made of materials highly resistant to chemical reaction with the fluid controlled.

The action of the diaphragm is such as to move the poppet toward and away from the valve seat and at the same time to guide the poppet during this motion without relying upon sliding contact with any guiding surfaces. Because of the lack of any wearing parts, long life is insured. This is also true of the valve seat and poppet, since the poppet engages the seat at the same rotational position every time, thus insuring that any wear that does take place improves the fit instead of changing the shape of the parts and causing a deterioration of the fit as would occur where the poppet is free to rotate about its own axis.

It will be apparent that various changes in the detailed design and arrangement of parts may occur to persons skilled in the art without departing from the spirit and scope of the present invention. Accordingly, it is to be understood that the above description is considered as being illustrative of, rather than limitative upon, the invention as defined by the appended claims.

I claim:
1. A valve for controlling fluid flow comprising:
   a housing having an inlet opening and an outlet opening with a fluid passage extending between said openings;
   a valve seat in said passage between said inlet and outlet openings;
   a hard metal poppet of hemispherical shape cooperating with the valve seat to control fluid flow through the passage;
   and a thin metal diaphragm attached to the poppet, said diaphragm comprising means to allow limited travel of the poppet away from the valve seat but having sufficient lateral rigidity to maintain alignment of the poppet with the valve seat and to direct movement of the poppet into an accurately seated position without the assistance of other guide means, whereby surfaces in sliding contact are eliminated inside the valve.

2. A valve according to claim 1 in which the diaphragm is made of stainless steel and is confined around its periphery by the housing.

3. A valve for controlling fluid flow comprising:
   a housing having an inlet opening and an outlet opening with a fluid passage extending between said openings;
   a valve seat in said passage between said inlet and outlet openings;
   a poppet cooperating with the valve seat to control fluid flow through the passage;
   a thin metal diaphragm attached to the poppet, said diaphragm comprising means to allow limited travel of the poppet away from the valve seat but having sufficient lateral rigidity to maintain alignment of the poppet with the valve seat and to direct movement of the poppet into an accurately seated position without the assistance of other guide means, whereby surfaces in sliding contact are eliminated inside the valve;
   a magnetic armature attached to the diaphragm at the face thereof opposite to the poppet;
   means biasing the diaphragm and poppet to a closed position;
   electromagnetic means including a core cooperating with the armature to move the poppet away from the seat against said biasing means when the solenoid is energized;
   the armature having a frusto-conical surface and the core having a frusto-conical recess of complementary shape to receive the armature;
   and a non-magnetic shield exposed within the recess to divide the core within the area of the recess into two sections at the surface of the recess to direct flux through the armature between the two core sections on either side of the non-magnetic shield.

4. A valve according to claim 3, in which the poppet is hemispherical in shape and made of tungsten carbide.

5. A valve according to claim 3, in which the metal diaphragm is of a material having the magnetic and corrosion resistant properties of stainless steel.

(References on following page)

References Cited

UNITED STATES PATENTS

| | | | |
|---|---|---|---|
| 2,916,252 | 12/1959 | Hobbs et al. | 251—129 |
| 3,059,667 | 10/1962 | Coceano | 251—368 X |
| 3,098,635 | 7/1963 | Delaporte et al. | 251—335 X |
| 3,105,507 | 10/1963 | Dunmire | 251—331 X |
| 3,134,932 | 5/1964 | Ray | 251—141 X |
| 3,326,512 | 6/1967 | Clarke | 251—335 X |
| 3,368,789 | 2/1968 | Martin | 251—141 |

FOREIGN PATENTS

| | | |
|---|---|---|
| 692,963 | 8/1930 | France. |
| 1,412,719 | 8/1965 | France. |
| 762,876 | 12/1956 | Great Britain. |

M. CARY NELSON, *Primary Examiner.*

ROBERT C. MILLER, *Assistant Examiner.*

U.S. Cl. X.R.

251—335